UNITED STATES PATENT OFFICE 2,434,899

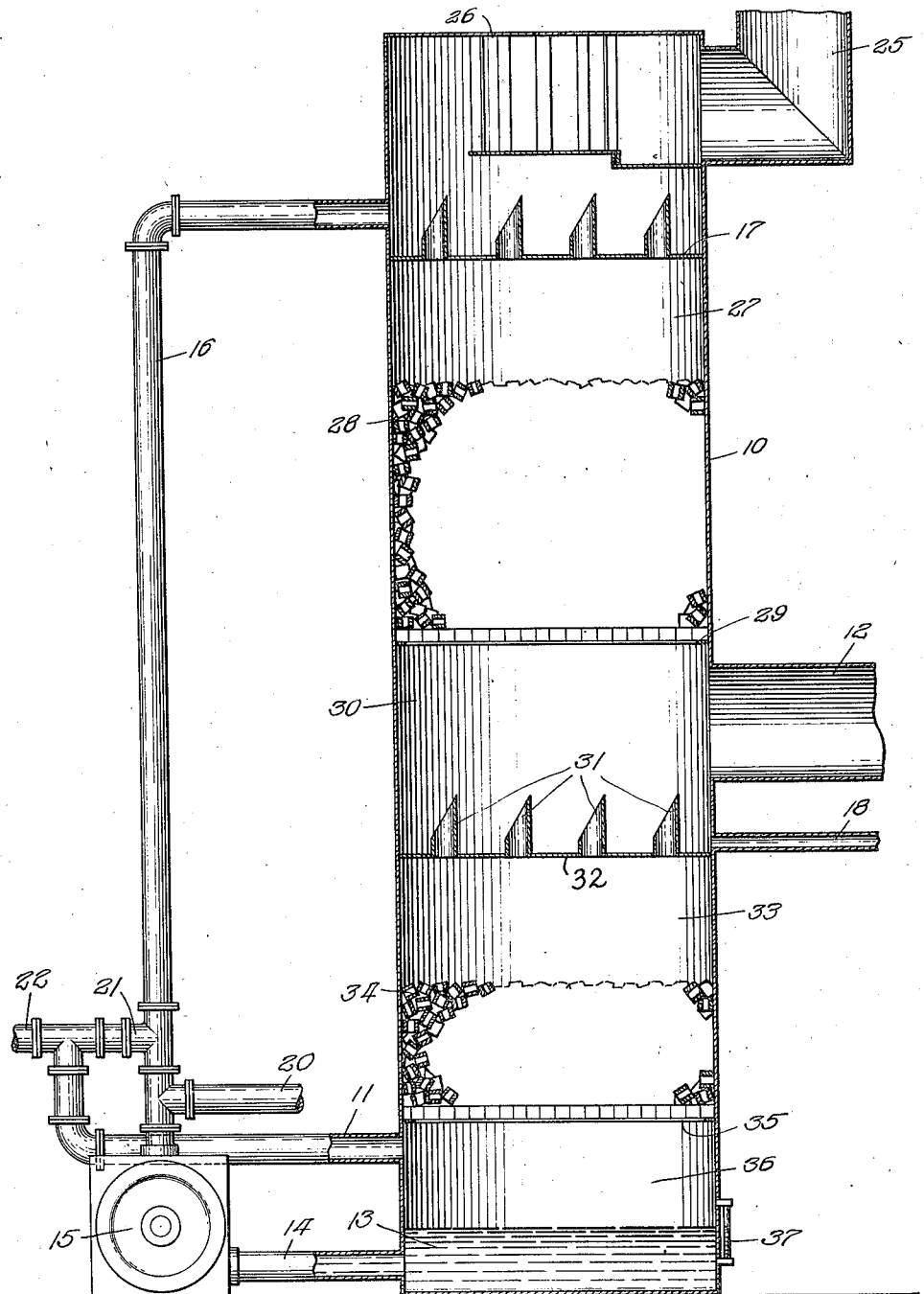

FORMATION OF CONCENTRATED SOLUTIONS OF AMMONIUM SALTS

James D. Biggs, Oronogo, Mo., assignor to The Military Chemical Works, Inc., a corporation of Missouri Application January 19, 1945, Serial No. 573,532

5 Claims. (Cl. 23—50)

This invention relates to the formation of concentrated solutions of ammonium salts and more particularly to the formation of ammonium nitrate.

At the present time ammonium nitrate is produced from nitric acid and ammonia gas by adding the ammonia and the acid to an aqueous solution of ammonium nitrate as shown, for example in Toniolo Patent 1,700,914. In such a process the ammonia is introduced at the bottom of a tower or column countercurrent to the flow of the ammonium nitrate solution therethrough. An ammoniacal ammonium nitrate solution is thus formed at the bottom of the tower and is withdrawn therefrom, charged with makeup acid, and introduced at the top of the tower countercurrent to a strong current of an inert gas such as air which dehumidifies the solution to the appropriate degree.

In operation of such a system it has been found that the capacity of any given column or tower is limited by the ability of the ammonium nitrate solution in the tower to absorb ammonia. When unduly large amounts of ammonia are charged to the system the stack loss of this ingredient increases undesirably.

It has now been discovered that the capacity of a given column may be greatly increased by introducing a substantial proportion of the ammonia to the circulating stream of ammonium nitrate solution passing from the bottom of the column to the top thereof after it has been acidified by the addition of the makeup acid. For example, in a given tower, the normal capacity of the tower was increased to approximately 180% by introducing about 35–40% of the ammonia in the circulating stream after acidification thereof, and while still maintained in a confined passageway through which it is passed for a substantial distance sufficient to obtain thorough admixing of the ammonia and the acid, and without any substantial separation.

Such form of treatment of course increases the top plate temperature in the tower. This has been found not to increase stack losses but to be of advantage in that it has increased the dehumidifying effect of the air used, with the result that no substantial increase has been required in the amount of inert gas passing through the tower.

The invention is illustrated diagrammatically in the drawing, in which 10 represents a standard Hobler tower having an ammonia inlet 11 at the bottom, an air inlet 12 near the middle thereof, and an ammonium nitrate sump 13 at the bottom from which the aqueous solution is pumped through the line 14 by the pump 15 through the line 16 onto the top plate 17 of the tower. Ammonium nitrate solution properly concentrated and in substantially neutral form is drawn off through the line 18 below the air inlet 12.

Makeup acid is introduced to the line 16 through the line 20 and a substantial proportion of the ammonia, preferably 30–40%, is introduced to the same line at 21 through the line 22. It will be noted that the circulating ammonium nitrate solution is confined to a pipe having no vapor space and the mixed ammonia gas and acidified ammonium nitrate solution pass therethrough for a distance great enough to avoid any flashing of ammonia when the solution is discharged upon the plate 17.

The tower is of course equipped with a stack 25 at the top, and a mist extractor or entrainment breaker 26 is employed in advance of the stack.

The internal structure of the tower or column is substantially conventional. Beneath the plate 17 is an open chamber 27 through which the ammonium nitrate solution falls after overflowing from the plate 17. The liquid then passes through a considerable body of Raschig rings or other contact packing 28 maintained upon the plate 29. These rings are adapted to give good contact between the nitrate solution and the air which enters through the line 12. Another chamber 30 is provided below the plate 29. Beneath this chamber 30 is a plate 32. This plate is adapted to maintain a liquid level of solution upon it which overflows through the overflow nipples 31. This level may be somewhat adjusted by the control of the draw-off line 18. In any event the draw-off opening is under all conditions liquid sealed by the liquid on the plate 32.

Beneath the plate 32 is a third vapor space 33, beneath which is another bed of Raschig rings or other contact packing maintained on the plate 35. Beneath the plate 35 is a fourth vapor space 36 into which the ammonia gas for the tower is introduced. A body of the ammonium nitrate solution which is highly ammoniacal is maintained within this chamber and may be regulated by viewing through the sight glass 37 and controlling the pump 15 and/or the draw-off 18 to maintain the desired level.

The amount of ammonia and acid introduced and the division of the ammonia between the inlets 11 and 21 is controlled to produce a substantially neutral ammonium nitrate at the draw-off 18. This solution should not contain more than 0.05% free ammonia and, by this process, may readily be made to contain as little as 0.02% or less free ammonia.

For example, the output of a tower which was producing slightly over 4 tons per day of ammonium nitrate (dry basis) per square foot of cross-section, was increased to over 7.5 (an 80% increase) tons per day by introducing about 36% of the total ammonia into the line 16. The daily consumption of NH₃ under normal operation was less than one ton per square foot of cross-section of the tower, and afterward the amount introduced to the tower was about 12% greater, while the total amount was about 80% greater. The ammonium nitrate circulated through pipe 16 was introduced at a point where the head of liquid thereon was some 15 ft. or more, and no appreciable separation thereof occurred.

The invention may also be employed on the production of other ammonium salts such as ammonium sulfate, ammonium phosphate, and other salts of ammonia with highly reactive acids.

Wherever ammonia is introduced at the bottom of the tower as well as in the side stream, the amount introduced in the side stream should be insufficient to render the solution alkaline if a neutral final solution is desired.

The foregoing detailed description has been given for clearness of understanding only, and no unnecessary limitations should be understood therefrom.

What I claim as new, and desire to secure by Letters Patent, is:

1. A method of producing a concentrated ammonium salt which comprises circulating a solution of the salt down through a column in countercurrent contact with a stream of dehydrating gas, and back to the top of the column through a confined side stream, acidifying the side stream by adding the acid component of the salt produced near the lower end thereof, and then introducing at least a substantial proportion of the ammonia gas into the acidified solution in said confined side stream at a point where a substantial liquid head in said confined stream aids in the absorption of ammonia.

2. A method of producing a concentrated ammonium salt which comprises circulating a solution of the salt down through a column in countercurrent contact with a stream of dehydrating gas, and back to the top of the column through a confined side stream, acidifying the side stream by adding the acid component of the salt produced to the confined side stream near the lower end thereof, introducing at least a substantial proportion of the ammonia gas into the confined side stream near the lower end thereof and maintaining the ammonia in contact with the acid in the side stream by the confinement thereof until the acid and ammonia have substantially completely reacted.

3. The method as set forth in claim 2 in which approximately 40% of the total ammonia is introduced to the side stream.

4. The method as set forth in claim 2 in which approximately 30% to 40% of the total ammonia is introduced to the side stream.

5. The method as set forth in claim 2 in which the acid is nitric acid.

JAMES D. BIGGS.

REFERENCES CITED

The following references are of record in the file of this patent:

UNITED STATES PATENTS

| Number | Name | Date |
|---|---|---|
| 1,217,247 | Washburne | Feb. 27, 1917 |
| 1,315,674 | Landis | Sept. 9, 1919 |

FOREIGN PATENTS

| Number | Country | Date |
|---|---|---|
| 43,827 | France | June 18, 1934 |
| | (1st addition to No. 751,128) | |